United States Patent Office 3,426,044
Patented Feb. 4, 1969

3,426,044
3,6 - DIHYDROXY - 1,2,3,6 - TETRAHYDRO-PHTHALIC ACID, ANHYDRIDE, DERIVATIVES AND POLYMERS THEREOF
Allen K. Sparks, Des Plaines, and Robert A. Dombro, Chicago, Ill., assignors to Universal Oil Products Company, Des Plaines, Ill., a corporation of Delaware
No Drawing. Filed Oct. 18, 1965, Ser. No. 497,461
U.S. Cl. 260—346.6  10 Claims
Int. Cl. C07d 5/38; C07c 63/18, 63/16

ABSTRACT OF THE DISCLOSURE 3,6-dihydroxy-1,2,3,6-tetrahydrophthalic acid and anhydrides and alkyl, phenyl and halogen derivatives thereof, suitable for use in the preparation of polymeric compositions by reaction with monomers containing reactive functional groups.

This invention relates to novel compositions of matter and to a use for said compositions as monomers in the preparation of polymeric products. More particularly, the invention is concerned with novel compositions of matter comprising dihydroxytetrahydrophthalic acids and anhydrides thereof and to the use of said compounds as monomers for the preparation of polyester resins.

The use of certain polymeric compositions of matter comprising plastics, resins, etc., has increased to a great degree in a relatively short period of time. For example, in recent years, plastics and resins have found increased use in architectural paneling, acoustical sound deadeners in walls and ceilings, as bodies for airplanes, automobiles and boats and many other uses too numerous to mention at this time. In view of this, plastics and resins must be prepared which will possess desirable characteristics such as hardness, elasticity, resistance to chemicals, shock, abrasion, fire, etc., said characteristics being dependent upon the particular starting materials which are utilized as monomers in the preparation of finished products.

It is therefore an object of this invention to provide a novel composition of matter which may be utilized as a monomer in the preparation of plastics and resins.

A further object of this invention is to provide novel compositions of matter comprising certain tetrahydrophthalic acids or anhydrides thereof which, when utilized as a monomer in the preparation of plastics or resins, will impart desirable characteristics to the finished product.

One embodiment of this invention resides in a compound selected from the group consisting of dihydroxytetrahydrophthalic acids and anhydrides thereof.

A further embodiment of this invention is found in a polymeric composition of matter comprising the reaction product of a monomer containing at least one reactive functional substituent selected from the group consisting of hydroxyl and carboxyl substituents, and a compound selected from the group consisting of dihydroxytetrahydrophthalic acids and anhydrides thereof.

A specific embodiment of this invention is found in 3,6-dihydroxy-1,2,3,6-tetrahydrophthalic acid.

Another specific embodiment of this invention is found in a polymeric composition of matter comprising the reaction product of a monomer containing at least one reactive functional substituent selected from the group consisting of hydroxyl and carboxyl substituents, and the compound of 4,5-dichloro-3,6-dihydroxy-1,2,3,6-tetrahydrophthalic acid.

Other objects and embodiments will be found in the following further detailed description of this invention.

As hereinbefore set forth, the present invention is concerned with novel compositions of matter and to the use thereof as monomers in the preparation of resins and plastics. The terms "dihydroxytetrahydrophthalic acids" and "dihydroxytetrahydrophthalic anhydride" as used in the present specification and appended claims will refer to both substituted acids and anhydrides as well as the acids and anhydrides themselves. The novel compositions of matter are prepared by condensing a furan with an unsaturated dicarboxylic acid or anhydride thereof in a Diels-Alder type manner at condensation conditions. Examples of olefinic dicarboxylic acids or anhydrides thereof which may be used include maleic acid, maleic anhydride, fumaric acid, itaconic acid, citrocinic acid, glutonic acid, mesaconic acid, vinylmalonic acid, allylmalonic acid, propylidinemalonic acid, vinylsuccinic acid, allylsuccinic acid, etc.; examples of furans which may be used include furan, 3-methylfuran, 3-ethylfuran, 3-propylfuran, 3,4-dimethylfuran, 3,4-diethylfuran, 3-chlorofuran, 3-bromofuran, 3,4-dichlorofuran, 3,4-dibromofuran, 3-phenylfuran, 3-benzylfuran, 3-p-tolylfuran, etc. It is to be understood that the aforementioned unsaturated dicarboxylic acids and furans are only representative of the class of compounds which may be used and that the persent invention is not necessarily limited thereto. The condensation between the aforementioned furans and the unsaturated dicarboxylic acids is effected in a Diels-Alder manner and preferably in the presence of a substantially inert organic solvent. When utilizing an organic solvent, the temperature at which the condensation is effected will be dependent upon the particular solvent utilized, the temperature being usually the reflux temperature of said solvent. Examples of organic solvents which may be used will include aromatic hydrocarbons such as benzene, toluene, xylene, ethylbenzene, etc.; paraffinic hydrocarbons both acyclic and cyclic in nature such as n-pentane, n-hexane, n-heptane, cyclopentane, methylcyclopentane, cyclohexane, etc.; or ethers such as dimethylether, diethylether, dipropylether, etc.

The desired product comprising the dihydroxytetrahydrophthalic acid or anhydride thereof is then obtained by treating the product resulting from the aforementioned condensation, namely, an epoxytetrahydrophthalic acid, anhydride or homologue thereof in any manner known in the art. One particular method which may be utilized comprises treating said product with acetic anhydride in the presence of a Friedel-Crafts type catalyst such as zinc chloride to obtain an ester which is then hydrolized to form the desired dihydroxytetrahydrophthalic acid. In the event that an anhydride is the desired product, it can be obtained by treating the acid in such a manner so as to convert the acid to the anhydride with a corresponding loss of water.

The process in which the compounds of the present invention may be prepared may be effected in any suitable manner and may comprise either a batch or continuous type operation. For example, when a batch type operation is used, a quantity of the furan or substituted furan and the olefinic dicarboxylic acid or anhydride thereof along with the substantially inert organic solvent is placed in an appropriate apparatus, and allowed to react at the proper operating conditions of temperature and pressure. The proper operating conditions of temperature and pressure may include temperatures in the range of from ambient (about 25° C.) to about 150° C. and pressures ranging from atmospheric to about 50 atmospheres, the amount of pressure utilized being that which is necessary to maintain a major portion of the reactants in the liquid phase. Upon completion of the desired residence time, the desired epoxytetrahydrophthalic acid or anhydride thereof is recovered by conventional means such as filtration, followed by fractional distillation, fractional crystallization, etc. The adduct comprising the epoxytetrahydrophthalic acid or anhydride thereof is then placed in a second apparatus along with an excess of an esterification agent such as acetic anhydride and a catalytic amount of Friedel-Crafts metal halide such as zinc chloride, aluminum chloride, etc. The mixture is then heated to the reflux temperature of the esterification agent and maintained thereat for a predetermined residence time, at the end of which time the flask and contents thereof are allowed to cool to room temperature.

The resultant diester is then hydrolyzed in the presence of a dilute base or dilute acid such as a dilute sodium hydroxide solution, dilute potassium hydroxide solution, dilute hydrochloric acid, dilute sulfuric acid, etc., to form the dihydroxytetrahydrophthalic acid. In the event that the anhydride of the acid is the desired compound, it may then be prepared by heating the dicarboxylic acid to drive off water and thus obtain the anhydride.

It is also contemplated within the scope of this invention that the novel compounds of the present invention may be prepared in a continuous manner of operation. When such an operation is used, the starting materials comprising the furan and the olefinic dicarboxylic acid or anhydride thereof are continuously charged to a reaction vessel which is maintained at the proper operating conditions of temperature and pressure. In addition, the inert organic solvent of the type hereinbefore set forth in greater detail is also continuously charged thereto. The resultant epoxytetrahydrophthalic acid or anhydride thereof is continuously withdrawn from the reaction vessel and separated from the solvent and any starting materials which may still be present, the latter being recycled to form a portion of the feed stock. The desired acid or anhydride is then continuously charged to a second vessel also maintained at the proper operating conditions of temperature and pressure. The esterification agent is charged to this second vessel through a separate line. In this second vessel, the esterification of the epoxytetrahydrophthalic acid or anhydride is effected in the presence of a catalytic amount of a metal halide such as zinc chloride. The resultant diester of the tetrahydrophthalic acid or anhydride is continuously withdrawn and again separated from any unreacted starting materials and/or side reaction products which may have been prepared. It is to be understood that in a continuous process of this type, in each case, the reactor effluent from the reaction zones is subjected to a separation step wherein the desired product from each zone is separated from the unreacted starting material in each step, the aforementioned unreacted starting materials being recycled to form a portion of the feed stock to each respective reaction zone. The diester of the tetrahydrophthalic acid or anhydride thereof is then charged to a third zone wherein it is hydrolyzed to form the dihydroxytetrahydrophthalic acid. This desired compound is then recovered in a conventional manner and, if an anhydride is desired the dicarboxylic acid is subjected to treatment to convert said acid to the anhydride thereof.

Examples of dihydroxytetrahydrophthalic acids or anhydrides thereof which may be prepared, and which, according to the present invention constitute novel compositions of matter include 3,6-dihydroxy-1,2,3,6-tetrahydrophthalic acid,
3,6-dihydroxy-1,2,3,6-tetrahydrophthalic anhydride,
4 - chloro-3,6-dihydroxy-1,2,3,6-tetrahydrophthalic anhydride,
4 - chloro - 3,6-dihydroxy-1,2,3,6-tetrahydrophthalic acid,
4,5 - dichloro - 3,6 - dihydroxy-1,2,3,6-tetrahydrophthalic acid,
4,5 - dichloro - 3,6 - dihydroxy-1,2,3,6-tetrahydrophthalic anhydride,
4 - bromo - 3,6 -dihydroxy - 1,2,3,6 - tetrahydrophthalic acid,
4 - bromo - 3,6-dihydroxy - 1,2,3,6-tetrahydrophthalic anhydride,
4,5 - dibromo - 3,6 - dihydroxy-1,2,3,6-tetrahydrophthalic acid,
4,5 - dibromo - 3,6 - dihydroxy - 1,2,3,6-tetrahydrophthalic anhydride,
4 - methyl - 3,6 - dihydroxy - 1,2,3,6 - tetrahydrophthalic acid,
4 - methyl - 3,6 - dihydroxy-1,2,3,6-tetrahydrophthalic anhydride,
4,5 - dimethyl - 3,6 - dihydroxy-1,2,3,6-tetrahydrophthalic acid,
4,5 - dimethyl - 3,6 - dihydroxy - 1,2,3,6-tetrahydrophthalic anhydride,
4-ethyl-3,6-dihydroxy-1,2,3,6-tetrahydrophthalic acid,
4 - ethyl - 3,6-dihydroxy-1,2,3,6-tetrahydrophthalic anhydride,
4,5 - diethyl - 3,6 - dihydroxy-1,2,3,6-tetrahydrophthalic acid,
4,5 - diethyl - 3,6-dihydroxy-1,2,3,6-tetrahydrophthalic anhydride,
4 - propyl - 3,6 - dihydroxy-1,2,3,6-tetrahydrophthalic acid,
4 - propyl - 3,6-dihydroxy-1,2,3,6-tetrahydrophthalic anhydride,
4,5-dipropyl - 3,6 - dihydroxy - 1,2,3,6-tetrahydrophathalic acid,
4,5 - dipropyl - 3,6-dihydroxy-1,2,3,6-tetrahydrophthalic anhydride,
1,2,4,5 - tetrachloro - 3,6 - dihydroxy - 1,2,3,6-tetrahydrophthalic acid,
1,2,4,5 - tetrachloro - 3,6 - dihydroxy - 1,2,3,6-tetrahydrophthalic anhydride,
1,2,4,5 - tetrabromo - 3,6 - dihydroxy - 1,2,3,6-tetrahydrophthalic acid,
1,2,4,5 - tetrabromo - 3,6 - dihydroxy - 1,2,3,6-tetrahydrophthalic anhydride,
1,2,4,5 - tetramethyl - 3,6 - dihydroxy - 1,2,3,6-tetrahydrophthalic acid,
1,2,4,5 - tetramethyl - 3,6 - dihydroxy - 1,2,3,6-tetrahydrophthalic anhydride,
1,2,4,5 - tetraethyl - 3,6 - dihydroxy - 1,2,3,6-tetrahydrophthalic acid,
1,2,4,5 - tetraethyl - 3,6 - dihydroxy - 1,2,3,6-tetrahydrophthalic anhydride,
4 - phenyl - 3,6 - dihydroxy - 1,2,3,6-tetrahydrophthalic acid,
4 - phenyl - 3,6 - dihydroxy - 1,2,3,6-tetrahydrophthalic anhydride,
4,5 - diphenyl - 3,6 - dihydroxy-1,2,3,6-tetrahydrophthalic acid,
4,5 - diphenyl - 3,6 - dihydroxy-1,2,3,6-tetrahydrophthalic anhydride, etc.

It is to be understood that the aforementioned compounds are only representative of the class of compounds which may be prepared and that the present invention is not necessarily limited thereto.

The novel compositions of matter thus produced may be utilized as components of the finished plastics or resins which may be generally termed "polymeric compositions of matter," the polymeric compositions of matter possessing desirable characteristics according to the particular monomers which were utilized. The dihydroxy tetrahydrophthalic acids or anhydrides thereof may be polymerized per se or copolymerized via the dicarboxylic acid or anhydride functions with di-, tri-, etc., hydroxy compounds such as ethylene glycol, propylene, glycol, butylene glycol, diethylene glycol, dipropylene glycol, hydroquinone, catechol, resorcinol, glycerol, pyrogallol, etc., and via the dihydroxy function with di-, tri-, etc., carboxylic acids such as malonic acid, succinic acid, glutaric acid, etc., tricarballylic acid, etc., phthalic acids, mellitic acids, etc., and anhydrides such as maleic anhydride, succinic anhydride, glutaconic anhydride, phthalic anhydride, etc., to form polyesters. These polyesters will contain unsaturation in certain portions of the molecule which will allow further polymerization, said polymerization being initiated by peroxide or an air-drying action. The polyesters thus prepared may comprise low molecular-weight unsaturated compounds which can then be epoxidized and used as stabilizing plasticizers for polyvinyl chloride resins. It is also contemplated that the unsaturated polyester thus produced by the reaction between the dihydroxytetrahydrophthalic acid or anhydride thereof and the compound containing hydroxyl and/or carboxyl functional groups may be further reacted with vinyl monomers such as styrene to form compounds which are utilizable as thermal-setting resins. If the polyester resin contains —OH terminals, it may be admixed with a diisocyanate such as, for example, tolylenediisocyanate to form polyurethane intermediates which can then be foamed by the addition of a foaming agent such as water, tertiary alcohols, etc., to form the desired polyurethane foams. The aforementioned preparation of the polyester plastic or resin may be effected at temperatures ranging from room temperature up to about 300° C. and a residence time ranging from a few minutes up to about 25 hours, the residence time being inversely proportioned to the temperature in which the reaction is carried out.

The following examples are given to illustrate the process of the present invention which, however, are not intended to limit the generally broad scope of the present invention in strict accordance therewith.

EXAMPLE I

In this example, 196 g. (2.0 moles) of maleic anhydride was dissolved in 625 cc. of anhydrous ethyl ether and placed in a condensation flask, thereafter 136 g. (2.0 moles) of furan was added and the resulting solution was allowed to stand at room temperature (about 25° C.) overnight. The adduct deposited out as crystals which were isolated by filtration. These crystals comprise 3,6-epoxy-1,2,3,6-tetrahydrophthalic anhydride having a melting point of 138°–140° C.

The 3,6 - epoxy - 1,2,3,6-tetrahydrophthalic anhydride which was prepared according to the above paragraph is then placed in a flask provided with a reflux condenser. To the flask is added an excess of acetic anhydride and 15 g. of zinc chloride. The flask is heated to a temperature of between 140–145° C. and refluxed for a period of about 2 to about 8 hours. At the end of this time, the flask and contents thereof are cooled to room temperature and the diacetate ester of the anhydride is recovered.

The ester prepared according to the above paragraph is then hydrolyzed by placing said ester in a flask along with a solvent comprising benzene and a dilute solution of sodium hydroxide. After a period of 2 to about 8 hours, the reaction mixture is subjected to fractional distillation under a reduced pressure and the desired product comprising 3,6 - dihydroxy - 1,2,3,6 - tetrahydrophthalic acid is recovered.

EXAMPLE II

In this example, a quantity of the 3,6-dihydroxy-1,2,3,6-tetrahydrophthalic acid which was prepared according to the above Example I is placed in a flask provided with a Dean-Stark water trap. In addition, a quantity of organic solvent comprising toluene is added thereto. The flask and contents thereof are then heated and the water resulting from the formation of the anhydride is azeotroped off and collected in the water trap. Following this, the solvent is flashed off and the desired 3,6-dihydroxy-1,2,3,6-tetrahydrophthalic anhydride is recovered.

EXAMPLE III

In this example, 196 g. (2.0 moles) of maleic anhydride is dissovled in 625 cc. of anhydrous ethyl ether and placed in a condensation flask. Following this, 274 g. (2.0 moles) of 3,4-dichlorofuran is added thereto. The solution is allowed to remain at room temperature for a period of about 16 hours, during which time the adduct will deposit out as crystals. These crystals are readily isolated by filtration and recrystallized from an organic solvent.

The 4,5 - dichloro-3,6-epoxy-1,2,3,6-tetrahydrophthalic anhydride which is prepared according to the above paragraph is then placed in a condensation flask provided with a reflux condenser along with an excess of acetic anhydride and a catalyst comprising zinc chloride. The flask is heated to a temperature of about 140–145° C. and maintained thereat for a period of about 4 hours. At the end of this time, the desired product comprising the diacetate ester of 4,5-dichloro-3,6-dihydroxytetrahydrophthalic anhydride is recovered by fractional crystallization.

The desired product is then prepared by dissolving the ester prepared according to the above paragraph in benzene and adding thereto a dilute solution of sodium hydroxide. Upon completion of the hydrolysis step the desired product comprising 4,5-dichloro-3,6-dihydroxy-1,2,3,6-tetrahydrophthalic acid is separated and recovered by conventional means.

EXAMPLE IV

A solution comprising 98 g. (1.0 mole) of maleic anhydride dissolved in 350 cc. of anhydrous ethyl ether is placed in a condensation flask. To this solution is added 92 g. (1.0 mole) of 3-methylfuran. After standing at room temperature for a period of about 16 hours, the crystalline adduct which deposits out is recovered by filtration from the anhydrous ethyl ether. The crystals are purified by conventional means and the product comprising 4-methyl-3,6-epoxy-1,2,3,6-tetrahydrophthalic anhydride is placed in a reflux condenser along with an excess of acetic anhydride and a catalytic amount of zinc chloride. The resulting solution is then refluxed for a period of about 4 hours, after which the diacetate ester is separated and recovered.

Following this, the diacetate ester of the tetrahydrophthalic anhydride is hydrolyzed by treatment with a dilute solution of potassium hydroxide to obtain 4-methyl-3,6-dihydroxy-1,2,3,6-tetrahydrophthalic acid.

EXAMPLE V

In this example, 98 g. (1.0 mole) of tetrahydrophthalic anhydride dissolved in 300 cc. of anhydrous ethyl ether is reacted with 112 g. (1.0 mole) of 3,4-diethylfuran. After standing at room temperature for a period of about 16 hours, the crystalline adduct comprising 4,5-diethyl-3,6 - epoxy - 1,2,3,6 - tetrahydrophthalic anhydride is recovered by filtration.

The substituted tetrahydrophthalic anhydride prepared according to the above paragraph is placed in a reflux apparatus along with an excess of acetic anhydride and a catalytic amount of zinc chloride. The apparatus is heated to a temperature of 140–145° C. and maintained thereat for a period of about 4 hours. At the end of this time, the desired product comprising the diacetate ester of the anhydride is recovered. The ester in then treated with a dilute solution of potassium hydroxide to convert the ester to 4,5 - diethyl - 3,6 - dihydroxy - 1,2,3,6-tetrahydrophthalic acid which is thereafter heated in an apparatus provided with a water trap in the pressure of an organic solvent to convert the acid to the desired product comprising 4,5 - diethyl-3,6-dihydroxy-1,2,3,6-tetrahydrophthalic anhydride.

EXAMPLE VI

To illustrate the use of dihydroxytetrahydrophthalic acids and anhydrides thereof as monomers, a polyester resin may be prepared by charging glycerol or pentaerythritol to a flask which is then swept with nitrogen and heated to a temperature between 90° and 100° C. Following this, 3,6-dihydroxy-1,2,3,6-tetrahydrophthalic acid and maleic anhydride are added to the flask. The flask is then heated to a temperature of 165° C. and maintained at a temperature in the range of from about 165° to about 175° C. for a period of about 6 hours. At the end of the desired time, the resultant polyester resin is recovered.

EXAMPLE VII

Other polyester resins may be prepared utilizing the acids and anhydrides prepared according to the Examples II to V above. These resins are prepared by utilizing said acids and anhydrides with a polyol in a manner similar to that set forth in Example III above. Following the addition of the particular acid or anhydride to the polyol the reaction mixture is maintained at an elevated temperature in the range of from about 165° to about 175° C. for a period of about 8 hours. At the end of the aforementioned reaction time, the particular polyester resin may be recovered and further treated by the addition of styrene. The mixture is further heated to a temperature of from about 70 to about 90° C. and maintained thereat for a period of about 2 hours. At the end of this time, the desired polyester resin is recovered.

We claim as our invention:

1. 3,6-dihydroxy-1,2,3,6-tetrahydrophthalic acid or anhydride having chlorine or bromine in the 1, 2, 4 and 5-positions.
2. 3,6-dihydroxy-1,2,3,6-tetrahydrophthalic acid or anhydride having chlorine or bromine in the 4 and 5-positions.
3. 3,6-dihydroxy-1,2,3,6-tetrahydrophthalic acid or anhydride having chlorine or bromine in the 4-position.
4. 4,5-dichloro-3,6-dihydroxy-1,2,3,6-tetrahydrophthalic acid.
5. 3,6-dihydroxy-1,2,3,6-tetrahydrophthalic acid or anhydride having alkyl of from 1 to 3 carbon atoms in the 4 and 5-positions.
6. 3,6-dihydroxy-1,2,3,6-tetrahydrophthalic acid or anhydride having alkyl of from 1 to 3 carbon atoms in the 4-position.
7. 4-methyl-3,6-dihydroxy - 1,2,3,6 - tetrahydrophthalic acid.
8. 4,5-diethyl-3,6-dihydroxy-1,2,3,6 - tetrahydrophthalic anhydride.
9. 4-phenyl-3,6-dihydroxy - 1,2,3,6 - tetrahydrophthalic acid or anhydride.
10. 4,5-diphenyl-3,6 - dihydroxy - 1,2,3,6 - tetrahydrophthalic acid or anhydride.

References Cited

Criegee et al.; Chem. Abstracts, vol. 48, p. 1239 b (1954).

ALEX MAZEL, *Primary Examiner.*

BERNARD DENTZ, *Assistant Examiner.*

U.S. Cl. X.R.

260—78.3, 514, 2